United States Patent [19]
Moon

[11] Patent Number: 5,825,776
[45] Date of Patent: Oct. 20, 1998

[54] CIRCUITRY AND METHOD FOR TRANSMITTING VOICE AND DATA SIGNALS UPON A WIRELESS COMMUNICATION CHANNEL

[75] Inventor: Billy G. Moon, Apex, N.C.

[73] Assignee: Ericsson Inc., Research Triangle Park, N.C.

[21] Appl. No.: 607,802

[22] Filed: Feb. 27, 1996

[51] Int. Cl.[6] .................................................. H04J 3/16
[52] U.S. Cl. ........................................ 370/437; 370/493
[58] Field of Search ..................................... 370/314, 321, 370/329, 337, 345, 347, 349, 464, 465, 466, 493, 494, 495, 498, 535, 536, 538, 537, 541, 542, 544, 543; 379/53, 54, 93, 94, 95, 96, 100.16, 100.13; 375/239

[56] References Cited

U.S. PATENT DOCUMENTS

| 5,381,412 | 1/1995 | Otani ........................................... 348/14 |
| 5,428,613 | 6/1995 | Spiotta et al. ........................... 370/85.7 |
| 5,475,681 | 12/1995 | White et al. ............................... 370/60 |
| 5,521,921 | 5/1996 | Murai ......................................... 370/82 |
| 5,581,555 | 12/1996 | Dubberty et al. ........................ 370/487 |
| 5,594,726 | 1/1997 | Thompson et al. ...................... 370/485 |

FOREIGN PATENT DOCUMENTS

| 07 254917 A | 10/1995 | Japan . |
| WO 91/07030 | 5/1991 | WIPO . |

Primary Examiner—Dang Ton
Attorney, Agent, or Firm—Jenkens & Gilchrist, P.C.

[57] ABSTRACT

Circuitry and an associated method for transmitting voice signals together with data signals upon a wireless communication channel. The data signals are transmitted at a selected level of reliability and the voice signals are transmitted at a selected throughput level. When utilizing a High level Data Link Control (HDLC) protocol scheme, data signals are transmitted upon numbered information frames and voice signals are transmitted as unnumbered information frames. By transmitting the voice signals together with the data signals, electronic communication devices requiring transmission of voice-over-data transmissions, such as multi-media devices, voice paging devices, and voicemail devices, can be realized utilizing wireless communication channels.

12 Claims, 3 Drawing Sheets

| I4 | UI1 | I3 | I2 | I1 |

CIRCUITRY AND METHOD FOR TRANSMITTING VOICE AND DATA SIGNALS UPON A WIRELESS COMMUNICATION CHANNEL

TECHNICAL FIELD OF THE INVENTION

The present invention relates generally to the transmission of information in a wireless communication system, such as, for example, the transmission of communication signals between a radiotelephonic device and the infrastructure of a radiotelephonic communication system or, for example, the transmission of communication signals between the radiotelephonic device and a peripheral device. More particularly, the present invention relates to circuitry and an associated method for transmitting a voice signal at a desired throughput level upon a data channel upon which data signals are transmitted at a selected level of reliability.

Operation of an embodiment of the present invention permits data signals and voice signals together to be transmitted upon a data channel. Communication of the data signals is effectuated at a selected level of reliability, and communication of the voice signals is effectuated at a selected throughput level. Bursts of speech, such as those utilized in voicemail, voice paging, multi-media, and other voice-over-data applications are thereby permitted to be transmitted upon a wireless data channel. When used in conjunction with a radiotelephonic device, voice and data signals can be communicated between a peripheral device, such as a portable computer, and the radiotelephonic device. Similar such signals can also be communicated between the radiotelephonic device and the infrastructure of a radiotelephonic communication system. The need to connect the peripheral device and the radiotelephonic device by way of a cable is obviated, and the need to concurrently utilize separate communication channels to communicate both voice and data signals is also obviated.

BACKGROUND OF THE INVENTION

Utilization of radiotelephonic communication systems to communicate telephonically has achieved wide popularity in recent years. Because a wireline connection is not required to effectuate telephonic communication in such systems, communication by way of a radiotelephonic communication system is possible at a location to which formation of a wireline connection would be impractical or impossible. Other types of wireless communication systems are similarly widely utilized.

A cellular communication system is exemplary of a radiotelephonic communication system. Cellular communication networks which form the infrastructure of cellular communication systems have been installed throughout significant portions of the world, and large numbers of subscribers to such cellular networks are able to communicate telephonically when positioned in areas encompassed by such cellular networks. Telephonic communication of both voice and data are permitted in such systems.

Utilization of a cellular communication system is advantageous as a user can communication pursuant to the communication system by way of a mobile transceiver, i.e., "cellular phone" or "subscriber unit," positioned anywhere throughout the geographic area encompassed by the network. As wireline connections are not required to effectuate communication, telephonic communication can be effectuated by a user, e.g., when traveling in a motor vehicle or in other situations in which communication by way of a conventional, wire line device would be inconvenient or impractical. Other types of wireless communication systems similarly are advantageously utilized as wireline connections are not required to effectuate communications.

While communication by way of a cellular, or other radiotelephonic, communication system is perhaps most typically thought of as being used to effectuate voice communication, effectuation of communication of other types of signals is also possible pursuant to a cellular, or other radiotelephonic, communication system. For instance, utilization of radiotelephonic devices to communication data, such as computer files generated or stored at a portable computing device, has become increasingly popular. By suitably connecting the portable computing device to the radiotelephonic device, data stored, or generated, at the computing device is provided to the radiotelephonic device by way of the connection. The radiotelephonic device transmits the data to the fixed network infrastructure of the radiotelephonic communication system. A reverse process is utilized to transmit data from the network infrastructure to be stored, or otherwise utilized, at the portable computing device.

Standardized protocols, such as the High level Data Link Control (HDLC) protocol scheme, have been promulgated to provide standardized manners by which to transmit such data. Similar such standardized protocols have been promulgated for use in these, and other, communication systems.

When communicating data, the reliability of the data transmission is typically of paramount importance. That is to say, proper reception of transmitted data is typically a primary consideration in determining the success of the data transmission. The data can be retransmitted in the event that transmitted portions of the data might not have been reliably communicated.

The aforementioned HDLC protocol provides for a manner by which to acknowledge reception of frames of data and to provide for the retransmission thereof in the absence of such an acknowledgment.

While error-free transmission of voice signals permits effectuation of optimal quality voice communications, transmission of voice signals is typically somewhat more forgiving of errors than that permitted in the communication of data. That is to say, although the quality of voice communications is reduced if the voice signals are not transmitted free of error, unless the errors introduced during transmission of the voice signal are so significant to prevent recreation of the transmitted voice signal, the transmitted signal is likely to be understood by a listener. Retransmission of a voice signal to ensure the error-free transmission thereof is typically not necessitated. Furthermore, if the voice communications are made pursuant to a two-way conversation, retransmission of such voice signals is not feasible. In contrast to the transmission of data signals, error-free transmission of voice signals is of lessened importance relative to the rate at which the voice signals are communicated.

The need to transmit voice signals together with data signals has increasingly become necessary in the operation of many types of communication devices. Multi-media communication devices require that voice-over-data be communicated. When the voice signals and data signals must be transmitted by way of a wireless communication system, such as a radiotelephonic communication system, transmission of the voice signals at a desired throughput and transmission of the data signals at the desired level of reliability has been quite problematic.

What is needed, therefore, is a manner by which to transmit voice signals together with data signals while ensuring that the data signals are transmitted at the desired level of reliability and that the voice signals are transmitted at the desired throughput level.

It is in light of this background information related to the transmission of voice and data signals in a wireless communication system, such as a radiotelephonic communication system, that the significant improvements of the present invention have evolved.

SUMMARY OF THE INVENTION

The present invention advantageously provides for the transmission of voice signals together with data signals in a wireless communication system. Communication of the data signals is effectuated with a required level of reliability, and communication of the voice signals is effectuated with a required throughput level.

When used in conjunction with a radiotelephonic device, both voice and data signals can be transmitted between the radiotelephonic device and the infrastructure of a radiotelephonic communication system. Both data and voice signals can similarly be transmitted between a peripheral device and the radiotelephonic device upon a wireless communication channel. Bursts of speech, such as speech bursts transmitted in a voicemail system, a voice paging system, or a multimedia system can be transmitted together with data to effectuate operation of such systems.

A High Level Data Link Control ("HDLC") protocol scheme can be utilized to transmit both the voice and data signals upon a data channel. In one embodiment, the data signals are transmitted as numbered frames defined in such an HDLC protocol scheme, and voice signals are transmitted in unnumbered information frames defined in such HDLC protocol scheme.

Because voice signals can be transmitted together with data signals upon a wireless communication channel formed between a peripheral device and a radiotelephonic device, the need for a hard-wired connector, otherwise required to interconnect the peripheral device and radiotelephonic device, is obviated. And, because the voice signals can be transmitted together with the data signals pursuant to an existing HDLC protocol scheme, existing radiotelephonic communications systems utilizing such a protocol scheme can be utilized to transmit and to receive such voice and data signals.

In these and other aspects, therefore, a communication station operable at least to transmit data signals upon a data channel includes voice transmitter circuitry for transmitting voice signals at a selected throughput rate. The voice signals are transmitted upon the data channel. A formatter is coupled to receive the voice signal. The formatter formats the voice signal pursuant to a first format and formats the data signal pursuant to a second format. A multiplexer is coupled to receive the voice signal and the data signal once formatted by the formatter. The multiplexer multiplexes the data signal and the voice signal together to form a multiplexed signal. A transmitter is coupled to receive the multiplexed signal formed by the multiplexer. The transmitter transmits the multiplexed signal, of which the voice signal forms a portion, upon the data channel at the selected throughput rate.

A more complete appreciation of the present invention and the scope thereof can be obtained from the accompanying drawing which are briefly summarized below, the following detailed description of the presently preferred embodiments of the invention, and the appended claims.

DETAILED DESCRIPTION

Figure 1:
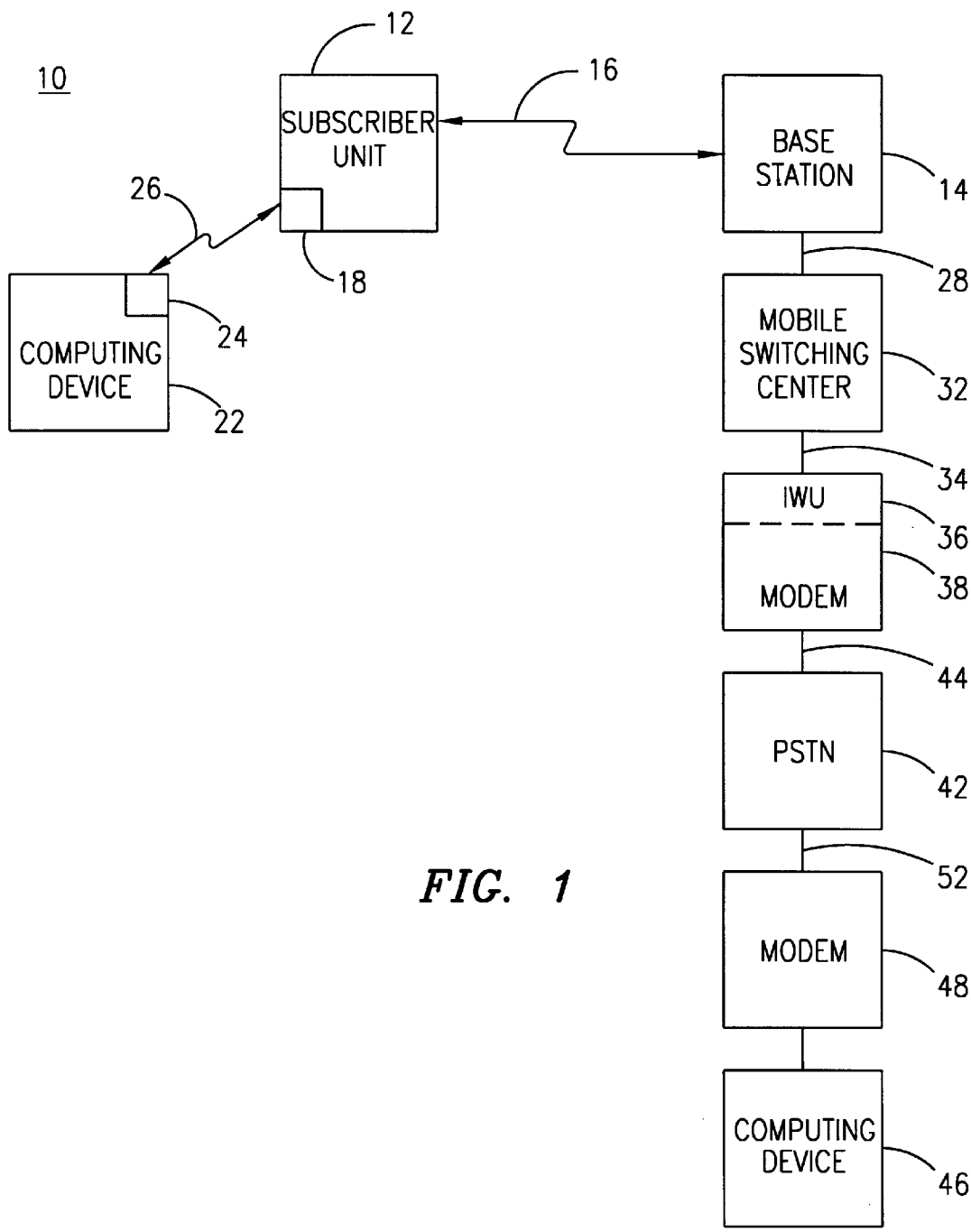
FIG. 1 illustrates a functional block diagram of a radiotelephonic communication system in which an embodiment of present invention is operable.

Turning first to FIG. 1, a communication system, shown generally at 10, is operable to communicate voice signals together with data signals. The communication system 10 is exemplary in nature and is illustrated to describe the operation of an embodiment of the present invention. It should be noted at the outset that various embodiments of the present invention may be embodied in other wireless communication systems to transmit voice signals together with data signals in manners analogous to those described with respect to the communication system 10.

The communication system 10 includes a mobile subscriber unit 12 operable to communicate with a fixed site base station 14 by way of one or more wireless communication channels 16. The subscriber unit 12 and the base station 14 here form portions of a cellular communication system. The subscriber unit 12 and base station may, alternately, form portions of another type of radiotelephonic communication system.

In addition to circuitry of the subscriber unit 12 permitting communication with the base station 14, the subscriber unit 12 further includes circuitry, indicated by the transceiver circuitry 18, permitting communication between the subscriber unit 12 and a portable computing device 22, such as a Personal Digital Assistant™.

The portable computing device 22 includes transceiver circuitry 24 to permit wireless communication by way of one or more communication channels 26 with the transceiver circuitry 18 of the subscriber unit 12.

The base station 14 is coupled by way of lines 28 to a mobile switching center 32. The mobile switching center 32, in turn, is coupled by way of lines 34 to an interworking unit (IWU) 36. The IWU 36 forms a portion of a voice and data modem 38. The voice and data modem 38 is coupled to a public service telephonic network (PSTN) 42 by way of lines 44, in conventional fashion.

A portable computing device 46 is coupled to the PSTN 42 by way of a voice and data modem 48 by way of lines 52, also in conventional fashion.

During operation, data generated or stored at the personal computing devices 22 and 46 can be communicated to each other through the subscriber unit 12 by way of the wireless communication channels 16 and 26. Voice signals together with data signals can be transmitted upon the wireless communication channels wherein the voice signals are transmitted at a selected throughput level while the data signals are transmitted with a selected level of reliability.

Voice-over-data communications can thereby be effectuated to permit, for example, multi-media communications between the personal computing devices 22 and 46.

In one embodiment, the various components of the communication system 10 are constructed to communicate using the standardized protocol scheme of the High level Data Link Control ("HDLC") standard, mentioned previously. As shall be described in greater detail below, the existing protocol scheme of the HDLC standard is utilized to transmit both the voice signals and data signals upon a wireless communication channel.

The voice signals are transmitted at a desired throughput level without guaranteeing the reliability of such transmission while the data signals are transmitted at a selected reliability level to ensure thereby that the data signals are transmitted with at least a selected level of accuracy. Voice signals generated at, for example, transducer elements of the portable computing device 22 are transmitted together with the data signals representative of data generated or stored at the portable computing device.

The voice signals together with the data signals generated at the portable computing device 22 are transmitted upon the wireless communication channel 26 by the transceiver circuitry 24 and are received at the transceiver circuitry 18 of the subscriber unit 12. The transceiver circuitry 24 and 18 may for instance, transmit the voice and data signals at infrared frequencies, such as those defined by the IrDA standard scheme or, for example, at a radio frequency data link, such as that defined by a wireless local area network (LAN) standard, such as the IEEE 802.11 standard.

Once the transceiver circuitry 18 of the subscriber unit 12 receives the voice and data signals transmitted thereto upon the wireless communication channel 26, the received signals are converted in frequency and otherwise altered to permit their transmission by the subscriber unit 12 upon the communication channels 16 extending between the subscriber unit 12 and the base station 14.

Signals received at the base station 14 are forwarded to the switching center 32 and thereafter provided to the interworking unit 36. The interworking unit is operative to provide the voice signals to the voice port of the modem 38 and the data signals to the data port thereof. The voice and data signals are transmitted in conventional fashion through the PSTN 42, thereafter to be provided to the personal computing device 46 by way of the voice and data modem 48.

Voice and data signals generated at the personal computing device 46 are transmitted to the portable computing device 22 in reverse manner. The interworking unit 36 is operative to receive the voice signals from the voice and data modem by formatting the voice portions of the signal received at the modem 38 according to the HDLC protocol scheme, as shall be noted below, and forwarding the formatted signal, formatted pursuant to the HDLC protocol scheme, on to the base station 14.

The base station 14 transmits the signals by way of a wireless communication channel to the subscriber unit 12 which converts the signals into a form to permit their transmission by the transceiving circuitry 18 thereof upon a wireless communication channel to the computing device 22.

Because voice signals can be transmitted together with data signals, voice together with data can be communicated between the computing devices 22 and 46.

Figures 2, 4:
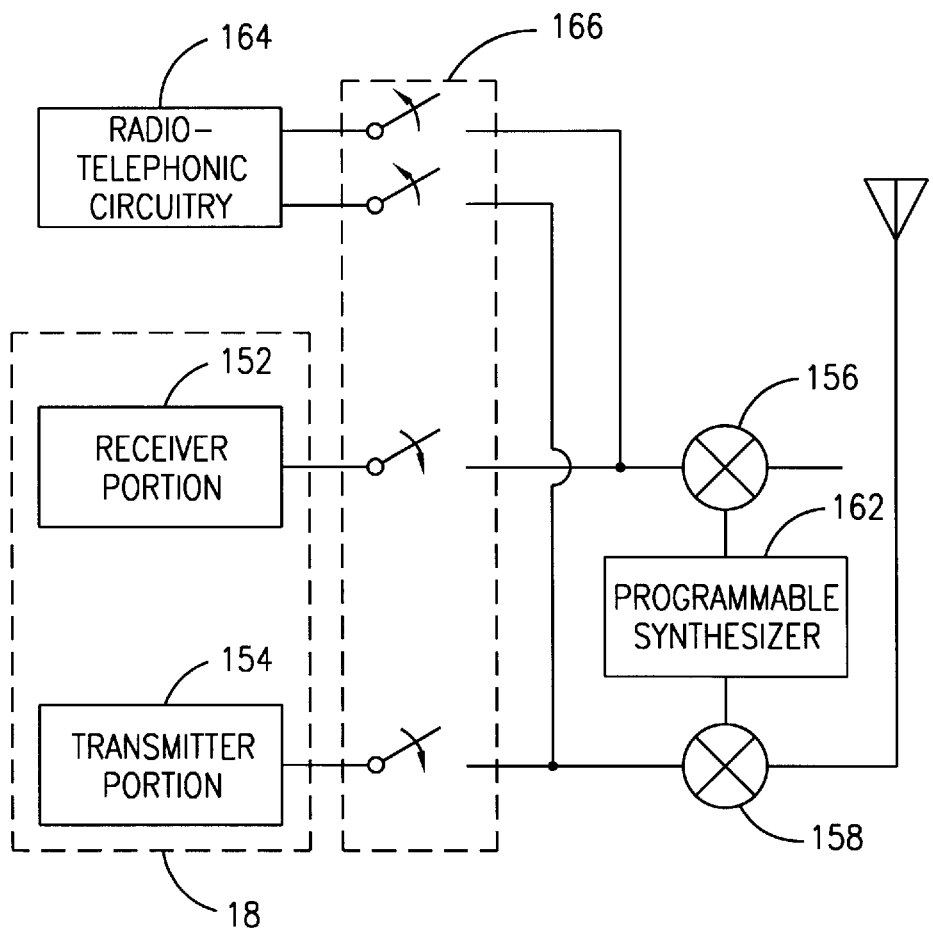
FIG. 2 illustrates an exemplary data transmission scheme which permits the transmission of voice signals together with data signals in an embodiment of the present invention.
FIG. 4 illustrates a functional block diagram of a radiotelephonic device of an embodiment of the present invention and which forms a portion of the communication system shown in FIG. 1.

FIG. 2 illustrates the signal transmission protocol of exemplary signals transmitted pursuant to an HDLC scheme. In an HDLC protocol scheme, voice and data signals are digitized and sequences of bits of the digitized voice and data signals are sequenced together to form frames. Frames of information are communicated between transmitting and receiving locations of a communication system, such as the transceiver circuitry 18 and 22 of the subscriber unit 12 and portable computing device 22 shown in FIG. 1.

The HDLC protocol scheme has been conventionally utilized to transmit data signals in numbered informational frames defined by such protocol scheme. While an embodiment of the present invention again utilizes the numbered informational frames to transmit data signals, unnumbered informational frames, also defined in the HDLC protocol scheme, are utilized to transmit voice signals.

FIG. 2 illustrates a portion of an exemplary communication signal, formatted pursuant to the HDLC protocol scheme. Four numbered informational frames, I1, I2, I3 and I4, are illustrated, each of which transmits frames of data signals. And, one unnumbered information frame, UI1, is illustrated to be inserted amongst the numbered informational frames; the unnumbered information frame is formed of voice signal information. Such frames can be modulated and transmitted upon a wireless communication channel. A receiver which receives such frames acknowledges receipt of the numbered informational frames and stores such frames in a receiver queue. In such manner, transmission errors can be detected and the numbered informational frames retransmitted in the event of detected transmission errors.

Receipt of the unnumbered information frame, conversely, is not acknowledged, and the unnumbered information frame is not stored in a receiver queue. Instead, the unnumbered frame is applied to be processed by a particular receiving application. When the unnumbered information frame is formed of a voice signal, such frame is applied to voice processing circuitry to process the voice signal contained therein.

While the reliability of the voice signal forming the unnumbered information frame is not verified, the rate of transmission of the unnumbered information frame is not reduced as such frame is applied directly to voice processing circuitry. Bursts of speech can be transmitted as unnumbered information frames defined in an existing, HDLC protocol scheme. Other types of protocol schemes can be similarly utilized to transmit voice together with data.

Electronic communication devices utilizing wireless communications, such as voice paging, voicemail, and multi-media applications, can effectuate communication of voice and data signals in an efficient manner utilizing an HDLC protocol scheme.

Figure 3:
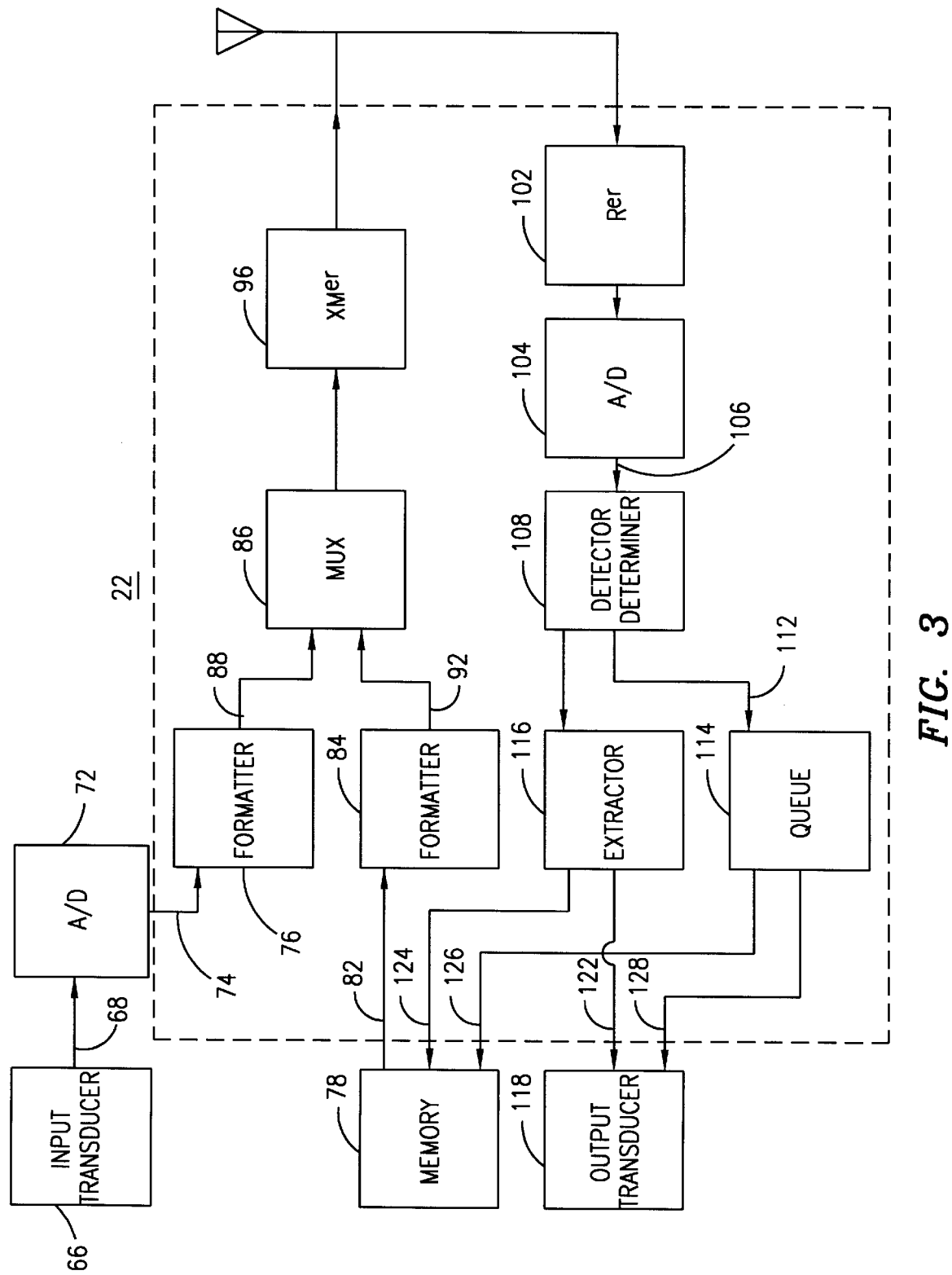
FIG. 3 illustrates a functional block diagram of a portable computing device of an embodiment of the present invention and which forms a portion of the communication system shown in FIG. 1.

FIG. 3 illustrates an exemplary portable computing device 22, shown previously in FIG. 1. The computing device includes transceiver circuitry 24 as a portion thereof. The transceiving circuitry 24 permits transmission of voice signals together with data signals and permits the reception of both voice and data signals transmitted thereto.

A transducer 66 converts aural signals into electrical form which are applied by way of line 68 to an analog-to-digital converter 72. The converter 72 generates digitized, voice signals on line 74 which are applied to a formatter 76 which forms the unnumbered information frames, described with respect to FIG. 2 above.

Data, here data stored at a memory element 78, is applied by way of line 82 to a formatter 84 which formats the data signals as frames of numbered information. The frames generated by the formatters 76 and 84 are applied to a multiplexer 86 by way of lines 88 and 92, respectively.

The multiplexer 86 is operative to multiplex the frames of information applied thereto and to generate a multiplexed signal on line 94 which is applied to a transmitter 96. The transmitter 96 modulates the frames of information to permit transmission thereof upon a wireless communication channel.

In one embodiment, the multiplexer 86 is operative to pass numbered information frames generated by the formatter 84 and, when an unnumbered information frame is generated by the formatter 76, to insert such unnumbered information frame to form the multiplexed signal. In such manner, the voice signals, formatted by the formatter 76, are immediately inserted into the multiplexed signal, without delay, to permit immediate transmission of the voice signals. As the throughput rate of the data signals is of lesser importance relative to the throughput level of transmission of the data signals, the immediate insertion of the unnumbered information frames into the multiplexed signal to form a portion thereof facilitates speedy transmission of the voice signals.

The transceiver circuitry 24 of the device 22 further permits the reception of numbered information frames and unnumbered information frames transmitted to the device 22. Received signals are down-converted by a receiver 102 and thereafter digitized by an analog-to-digital converter 104. Digitized signals generated by the converter 104 are applied, by way line 106, to a detector 108. The detector 108 detects which of the frames of the received signal form numbered information frames and which of the frames are formed of numbered information frames.

The numbered information frames are transmitted upon line 112 to be stored in a receiver queue 114, and an extractor 116 extracts the unnumbered information frames and applies such information frames directly to an application device, such as an output transducer 118 by way of the lines 122 or, for example, the memory element 78, by way of lines 124. The data stored at the receiver queue 114 can thereafter be applied to the memory element 78 by way of lines 126 or applied to the output transducer 118 by way of lines 128. Two-way communication of voice and data signals is thereby possible utilizing an HDLC protocol scheme.

FIG. 4 illustrates the subscriber unit 12, shown previously in FIG. 1, of an embodiment of the present invention. The radio telephonic device 12 is again shown to include transceiver circuitry 18 forming a portion thereof. As described previously, the transceiver circuitry 18 is operative to transmit and to receive voice and data signals to and from a portable computing device.

Here, the transceiver circuitry is shown to include a receiver portion 152 for receiving signals transmitted by the computing device and a transmitter portion 154 for transmitting signals to the portable computing device. The receiver portion 152 is selectively coupled to a downmixer 156, and the transmitter portion 154 is selectively coupled to an upmixer 158. The downmixer and upmixer 156 and 158 are coupled to receive upmixing and downmixing signals generated by a programmable synthesizer 162, in conventional fashion. The device 12 further includes radiotelephonic circuitry 164 containing transceiving circuitry to permit conventional operation of the radio telephonic device 12. The circuitry 164 is also selectively coupled to the downmixer 156 and the upmixer 158.

A switch element 166 connects either the radio telephonic circuitry 164 or the transceiver circuitry 118 to the upmixer and downmixer 156 and 158. Actuation of the switch element 166 into an appropriate switch position permits operation of the radio telephonic device 12 in conventional fashion or to transceive any signals to and from the portable computing device.

In such manner, voice and data signals transmitted together can be communicated between the portable computing device, such as the portable computing device 22 and another computing device by way of a public service telephonic network. In other embodiments, the radiotelephonic device 12 includes circuitry analogous to the circuitry forming portions of the portable computing device 22 to permit voice and data signals generated at the radiotelephonic device to be transmitted to the fixed infrastructure of the communication system.

Operation of an embodiment of the present invention permits data signals and voice signals together to be transmitted upon a data channel. Communication of the data signals is effectuated at a selected level of reliability, and communication of the voice signals is effectuated at a selected throughput level. Bursts of speech, such as those utilized in voicemail, voice paging, multi-media, and other voice-over-data applications are thereby permitted to be transmitted upon a wireless data channel. When used in conjunction with a radiotelephonic device, voice and data signals can be communicated between a peripheral device, such as a portable computer, and the radiotelephonic device. Similar such signals can also be communicated between the radiotelephonic device and the infrastructure of a radiotelephonic communication system. The need to connect the peripheral device and the radiotelephonic device by way of a cable is obviated, and the need to concurrently utilize separate communication channels to communicate both voice and data signals is also obviated.

The previous descriptions are of preferred examples for implementing the invention, and the scope of the invention should not necessarily be limited by this description. The scope of the present invention is defined by the following claims.

What is claimed is:

1. In a radio communication station operable at least selectively to transmit a data signal upon a radio channel and a voice signal upon the radio channel to a remote station, an improvement of transmitter circuitry for transmitting the voice signal at a selected throughput rate on the radio channel, said voice transmitter circuitry comprising:

a formatter coupled to receive the voice signal and to receive the data signal, said formatter for formatting the voice signal into formatted voice signal portions pursuant to a first format and for formatting the data signal pursuant to a second format, the second format by which the data signal is formatted including numerical identifiers identifying formatted data signal portions;

a multiplexer coupled to receive the voice signal and the data signal once formatter by said formatter, said multiplexer for multiplexing the data signal and the voice signal together to form a multiplexed signal, said multiplexer immediately inserting formatted voice signal portions into the multiplexed signal when received thereat;

a radio transmitter coupled to receive the multiplexed signal formed by said multiplexer, said transmitter for transmitting the multiplexed signal, of which the voice signal forms a portion, upon the data channel at the selected throughput rate; and a radio receiver tunable to receive acknowledgment signals generated by the remote station, the acknowledgment signals indicating reception at the remote station of the formatted data signal portions.

2. The transmitter circuitry of claim 1 wherein said formatter formats the voice signal into frames pursuant to the first format and formats the data signal into frames pursuant to the second format.

3. The transmitter circuitry of claim 2 wherein the frames into which the voice signal is formatted pursuant to the first format comprise unnumbered information frames of a high level data link control formatting scheme.

4. The transmitter circuitry of claim 2 wherein the frames into which the data signal is formatted pursuant to the second format comprise numbered information frames of a high level data link control formatting scheme.

5. The transmitter of claim 2 wherein the multiplexed signal formed by said multiplexer is formed of sequences of frames into which said formatter formats both the voice signal and the data signal.

6. The transmitter circuitry of claim 1 further comprising a coder for coding the voice signal according to a selected coding scheme and wherein said formatter is coupled to said coder to receive the voice signal once coded by said coder.

7. The transmitter circuitry of claim 6 wherein the voice signal formatted into the first format comprise expedited informational frames and wherein said multiplexer expedites insertion of the expedited informational frames into the sequence of frames forming the multiplexed signal.

8. The transmitter circuitry of claim 1 wherein said radio transmitter comprises a radio frequency modulator for modulating the multiplexed signal at a radio frequency.

9. The transmitter circuitry of claim 1 wherein said transmitter comprises an infrared frequency modulator for modulating the multiplexed signal at an infrared frequency.

10. The transmitter circuitry of claim 1 wherein the communication station comprises a first wireless transceiver operable to transceive voice-over-data signals, the wireless transceiver further having receiver circuitry for receiving receive signals transmitted thereto, the receive signals comprising acknowledgments of accurate transmission of portions of the multiplexed signal formed of the data signal formatted pursuant to the second format; and wherein said radio transmitter repeats transmission of portions of the multiplexed signal formed of the data signal formatted pursuant to the second format in the absence of reception at said radio receiver of the acknowledgments.

11. The transmitter circuitry of claim 10 wherein the radio communication station comprises a radio telephone and wherein said formatter, said multiplexer, said radio receiver, and said radio transmitter are embodied within said radio telephone.

12. The transmitter circuitry of claim 10 wherein the radio communication station comprises a multimedia device and wherein said formatter, said multiplexer, said radio receiver, and said radio transmitter are embodied within said multimedia device.

* * * * *